June 8, 1943.  H. PELPHREY  2,321,102
TOOTH RELIEVING MACHINE
Filed Oct. 24, 1940   2 Sheets-Sheet 1

INVENTOR
Harry Pelphrey.
BY Harness, Dickey & Pierce.
ATTORNEYS.

June 8, 1943.   H. PELPHREY   2,321,102
TOOTH RELIEVING MACHINE
Filed Oct. 24, 1940   2 Sheets-Sheet 2

INVENTOR
*Harry Pelphrey.*
BY
*Harness, Dickey & Pierce.*
ATTORNEYS.

Patented June 8, 1943

2,321,102

UNITED STATES PATENT OFFICE 2,321,102

TOOTH RELIEVING MACHINE

Harry Pelphrey, Detroit, Mich.

Application October 24, 1940, Serial No. 362,490

6 Claims. (Cl. 90—2)

My invention relates to gear finishing machines and particularly to a machine for cutting and relieving the threads of worms.

In my co-pending application, Serial No. 362,489, filed October 24, 1940, and in the co-pending application of F. E. Birtch, Serial No. 363,084, filed October 28, 1940, both applications assigned to the assignee of the present invention, a machine and method has been described and claimed for machining and relieving the ends of the threads of worms. The worms are preferably of the Hindley type, wherein the thread of the worm and the teeth of the wheel envelope each other. The flanks of the thread and teeth are disposed on straight lines in planes passing through the axis of the worm and normal to the axis of the wheel, which straight lines are tangent to a theoretical base circle of less diameter than the worm wheel.

The length of the worm is limited by the diameter of the base circle, otherwise, material interference would occur when attempting to extend the threads beyond parallel tangents to the circle. The worm is made as long as possible to obtain strength and a greater area of contact, and for this reason relief is desirable on the ends of the threads to eliminate any interference and to produce initial contact between the threads and the teeth in a progressive manner. The worm gear units of the Hindley type are unique in that material area contact is provided between the flanks of the thread and the worm so that the meshing engagement tends to generate rather than to destroy the form of the teeth.

The present invention includes a machine for producing the relief on the ends of the worm threads and also, when desirable, for machining the thread on the worm blank. The machine embodies a head and tail stock for supporting the worm for rotational movement. A table is provided having a milling type of tool thereon disposed in the plane of the axis of the worm and mounted for advancement across the worm body. Independent driving means is provided for the worm and for operating the table which supports the tool. A template is mounted on a slide operated by the driving means for the blank. The template moves past a stylus which controls the operation of the driving means for the table for driving the table in synchronism with the rotation of the work blank and controlled by the shape of the template. The stylus is mounted on a carriage which is driven by the means for driving the table, to be moved away from the template to interrupt the engagement with the stylus and therefore the operation of the table and carriage driving means. In this manner, increments of movement are provided to the table to advance the tool across the blank face in accordance with the shape of the template. By shaping the template in a desired manner the type of thread and the relief on the end thereof is accurately controlled.

Accordingly, the main objects of my invention are; to provide a device for machining a thread on a worm blank following the form of a template which controls the position of the tool relative to the rotation of the work blank; to provide a template of predetermined form for producing the advancement of a cutting tool relative to the blank conforming to the rotation of the blank; to provide means for driving a worm blank in rotation and incrementally advance a cutting tool by independent driving means energized in accordance with the shape of a template advanced by the first driving means; and in general, to provide a means for machining threads and providing a relief on the threads of worms which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Fig. 3 is a sectional view of the structure illustrated in Fig. 1, taken on the line 3—3 thereof;

Fig. 4 is an enlarged view in elevation of a worm after being relieved in the machine illustrated in Fig. 1 by my method; and Fig. 5 is an enlarged view of one end of the thread on the worm illustrated in Fig. 4.

Figure 1:
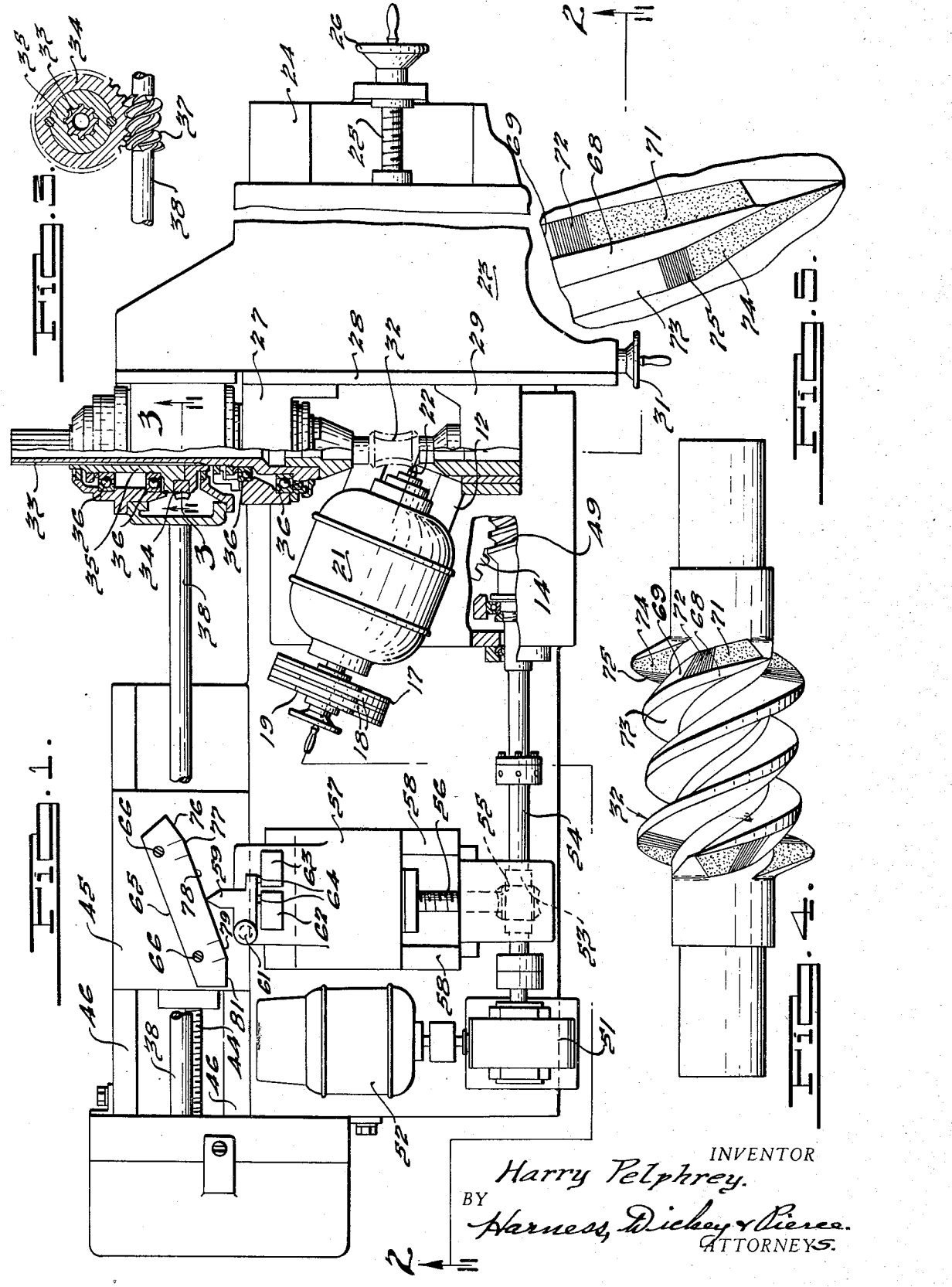
Figure 1 is a broken plan view with parts in section of a machine embodying features of my invention.
Figure 2:
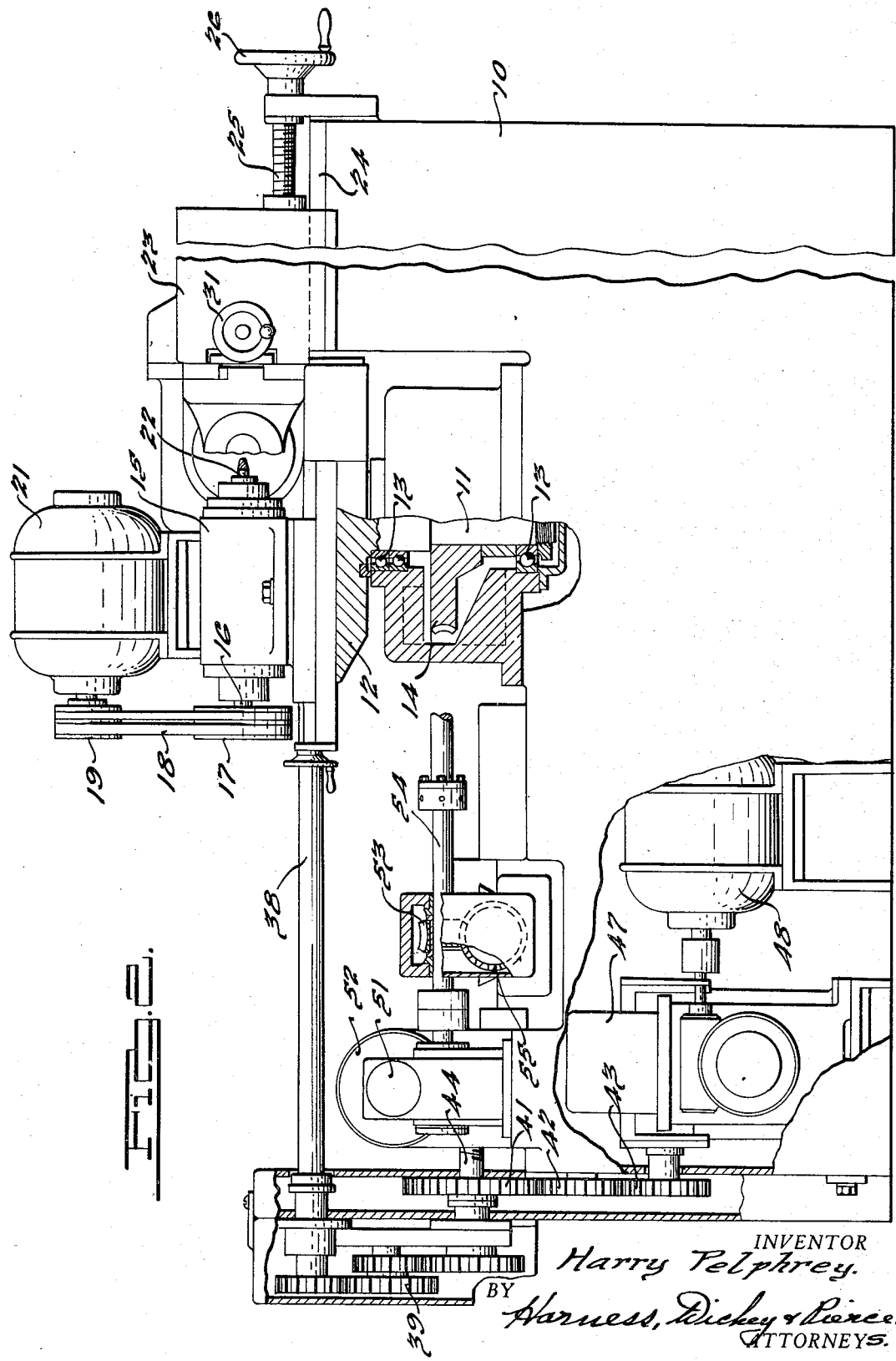
Fig. 2 is a sectional view of the structure illustrated in Fig. 1, taken on the line 2—2 thereof.

Referring to Figs. 1, 2, and 3, the machine embodies a base 10 supporting a vertical shaft 11 having a table 12 on the upper end. Suitable bearings 13 support the shaft for rotational movement, driven by a worm wheel 14. The table supports a bearing boss 15 in which a tool spindle 16 is driven by pulleys 17 from belts 18 and pulleys 19, the latter of which is driven by a motor 21 mounted upon the bearing boss 15. The opposite end of the spindle 16 drives a milling type of tool 22 having a cutting surface of predetermined form.

A work supporting table 23 is mounted on ways 24 of the bed 10 for adjustment toward and away from the tool 22, by a lead screw 25 operated by a hand wheel 26. A head stock 27 is mounted on ways 28 of the table 23 in which a tail stock 29 is also supported, being adjustable by a lead screw operated by a hand wheel 31. The worm blank 32 is supported in the head and tail stock. The head stock contains a splined sleeve 33 which permits the adjustment of the head stock in ways 28 while maintained in driving relation with a worm wheel 34. The worm wheel 34 is supported on an internally splined sleeve 35, the splines of which mate with the splines of the sleeve 33. Suitable bearings 36 support the sleeve for rotational movement.

The worm wheel 34 is driven by a worm 37 mounted on a shaft 38 driven through suitable change gears 39 from a set of gears 41, 42, 43. The gear 41 is mounted on a shaft 44 threaded to form a lead screw which drives a carriage 45 parallel to the shaft 38 on ways 46. It will be noted that the table 45 is driven in synchronism with the driving of the shaft 38 and thereby the worm blank 32. The gear 43 is driven from a speed reducing unit 47 by a motor 48 which is mounted within the bed of the machine 10. The worm wheel 14 which drives the carriage 12 is driven by a worm 49 from a speed reducing unit 51 operated by a motor 52.

A worm 53 is keyed to the shaft 54, which interconnects the speed reducing unit 51 to the worm 49, and drives a worm wheel 55 and a lead screw 56. The lead screw operates a table 57 in ways 58 provided on the bed of the machine. The table 57 carries a stylus 59 mounted on a pivot 61. "Make" and "break" switches 62 and 63 respectively, are secured on the table in position to have the operating buttons 64 thereof engageable by the stylus. The switch 62 is repeatedly closed and opened when the form on the template 65 projects, to move the table 57 incrementally away therefrom following the form of the projection. Similarly, the switch 63 is repeatedly closed and opened at the point of indentation to incrementally move the table 57 toward the template by the reverse operation of the motor 52. Suitable relay and control mechanism (not herein illustrated) is provided for connecting the electric circuits from the switches to the motor 52.

The template 65 is mounted on the table 45 by suitable means herein illustrated as by screws 66. The template is mounted in position to be engaged by the end of the stylus as the carriage is moved to the right as viewed in the figures. The movement of the stylus by the template moves the operating button 64 on one or the other switch, thereby selectively completing the circuit through the switches to operate the motor 52 in forward or reverse direction. The operation of the motor rotates the table 12 in clockwise or counterclockwise direction and moves the cutter 22 across the worm. This movement also drives the lead screw 56, as pointed out hereinabove, to move the table 57 and therefore the stylus 59 toward or away from the template 65.

It is to be understood that increments of movement of the motor are small so that a substantially constant movement of the tool across the worm occurs. The stylus will accurately follow the contour of the template 65 as the table 57 is advanced by the lead screw 44 by the incremental operation of the motor 52 which also advances the cutter 22 at substantially a constant rate across the worm following the form on the template.

It will be noted in Figs. 4 and 5 that a thread 68 has one flank 69 materially relieved at 71, which relief blends into the flank 69 at a portion 72 at which contact with the flank of a tooth occurs. In a similar manner the flank 73 is materially relieved at 74 which blends into flank 73 at 75.

In referring to the template 65 in Fig. 1, it will be noted that an angularly disposed area 76 corresponds to the materially relieved area 71 while an area of less angularity 77 conforms to the area 72 which joins the materially relieved portion 71 to the flank 69. The flank 69 is represented by the area 78 and the opposite end of the thread has a blended relief area 72 formed by the sloping surface 79 on the template while the materially relieved portion 71 thereon is produced by the sloping template portion 81. The template 65 would therefore be employed for finishing and relieving the thread flanks on one side thereof with relief provided at both ends of the thread. When the opposite side of the threads are to be relieved, a different template would be provided having areas 75 and 76 sloping outwardly from the areas 78 and from each other to thereby produce the relief on the opposite flank at both ends thereof.

It will thus be seen that the machine is universal in operation since the table 23 may be adjusted away from the tool so as to operate on worms of worm sets having different center distances. The head and tail stocks 27 and 29, in like manner, are adjustable toward and away from each other to receive and drive worm shafts of different lengths. By designing the proper template 65 a helical thread may be machined or followed by the tool which would also relieve the ends in a desired manner. The degree of relief and the blending of the relief into the tooth flanks is regulated by the shape of the template at the ends and the operation of the device is such that the relationship of the stylus to the template is accurately produced between the cutter and the worm blank so that the relief on the template is simulated at the ends of the threads of the blank.

While I have described and illustrated but a single embodiment of my invention, it will be apparent to those skilled in the art that various changes, omissions, additions and substitutions may be made therein without departing from the spirit and scope of my invention, as set forth in the accompanying claims.

What I claim is:

1. A device for relieving the threads of a worm which includes, means for supporting a worm blank, means for driving said blank at a constant speed, a slide driven by said driving means, a template on said slide, a cutting tool, a table supporting said tool, means for driving said table, a second slide, a stylus carried by said second slide and engageable with said template as the template is advanced, and means operated by said stylus for energizing and de-energizing the second said driving means in accordance with the relative position between the stylus and template.

2. In a machine for cutting worms, the combination with a support for a worm blank, means for driving said worm blank in rotation at a predetermined speed, a slide driven by said driving means, a template on said slide, a cutter, means for supporting said cutter for movement across said blank, a second driving means for operating said cutter support, a second slide operated by said second driving means, a stylus on said second table engageable with said template as it is advanced thereby, and means operated by said stylus for intermittently operating said second driving means for advancing the cutter relative to the worm blank advancement and the second slide, following the change in relationship between the template and the stylus.

3. In a machine for cutting worms, the combination with a support for a worm blank, means for driving said worm blank in rotation at a predetermined speed, a slide driven by said driving means, a template on said slide, a cutter, means for supporting said cutter for movement across said blank, a second driving means for operating said cutter support, a second slide operated by said second driving means, a stylus on said second table engageable with said template as it is advanced thereby, means operated by said stylus for intermittently operating said second driving means for advancing the cutter relative to the worm blank advancement and the second slide, following the change in relationship between the template and the stylus, and means for adjusting the worm blank support relative to the cutter to machine worm blanks having different center distance relationship with the worm wheel.

4. In a machine for relieving the ends of worm threads comprising, means for driving a worm blank, a cutter, means for driving said cutter, a pair of tables each driven by one of said driving means, a template on one table, a stylus on another table, and means responsive to engagement between said sylus and template for advancing said cutter following the form on the template to reproduce said form on the flank on one side of the thread of the worm.

5. In a machine for relieving the ends of worm threads comprising, means for driving a worm blank, a cutter, means for driving said cutter, a pair of tables each driven by one of said driving means, a template on one table, a stylus on another table, means responsive to engagement between said stylus and template for advancing said cutter following the form on the template to reproduce said form on the flank on one side of the thread of the worm, and a second template of a form to operate the driving means for the cutter to machine the opposite flanks of said thread following the form of the template.

6. In a machine for relieving the ends of worm threads comprising, means for driving a worm blank, a cutter, means for driving said cutter, a pair of tables each driven by one of said driving means, a template on one table, a stylus on another table, means responsive to engagement between said stylus and template for advancing said cutter following the form on the template to reproduce said form on the flank on one side of the thread of the worm, said template being provided with end areas which produce material relief on the thread ends, a central area following the lead of the thread, and areas between said central and end areas which produce the blending of the materially relieved area with the flanks of the thread.

HARRY PELPHREY.